US008357424B2

(12) United States Patent
Jacobson et al.

(10) Patent No.: US 8,357,424 B2
(45) Date of Patent: Jan. 22, 2013

(54) PREPARATION OF NANOPARTICLE CHAINS COMPRISING REACTING OF FUNCTIONAL GROUPS

(75) Inventors: Joseph M. Jacobson, Newton, MA (US); David W. Mosley, Cambridge, MA (US); Kie-Moon Sung, Cambridge, MA (US)

(73) Assignee: Massachusetts Institue of Technology, Cambridge, MA (US)

( * ) Notice: Subject to any disclaimer, the term of this patent is extended or adjusted under 35 U.S.C. 154(b) by 17 days.

(21) Appl. No.: 12/352,129

(22) Filed: Jan. 12, 2009

(65) Prior Publication Data
US 2009/0124780 A1    May 14, 2009

Related U.S. Application Data

(62) Division of application No. 10/621,790, filed on Jul. 17, 2003, now Pat. No. 7,476,442.

(60) Provisional application No. 60/396,337, filed on Jul. 17, 2002.

(51) Int. Cl.
*B32B 5/16*     (2006.01)
*B05D 7/00*     (2006.01)
(52) U.S. Cl. ......... 427/201; 427/203; 427/444; 428/403
(58) Field of Classification Search .................. 427/201, 427/203, 444; 428/403
See application file for complete search history.

(56) References Cited

U.S. PATENT DOCUMENTS

| 5,310,869 | A  | * | 5/1994  | Lewis et al. ................ 430/272.1 |
| 5,609,907 | A  | * | 3/1997  | Natan ........................... 427/2.12 |
| 6,242,264 | B1 | * | 6/2001  | Natan et al. .................. 436/171 |
| 6,805,904 | B2 | * | 10/2004 | Anders et al. ................ 427/203 |
| 6,984,265 | B1 | * | 1/2006  | Raguse et al. .................. 117/73 |
| 7,097,902 | B2 | * | 8/2006  | Blanton et al. ............... 428/330 |
| 7,470,840 | B2 | * | 12/2008 | Emrick et al. ................ 424/490 |
| 7,626,192 | B2 | * | 12/2009 | Hutchison et al. .............. 257/9 |

OTHER PUBLICATIONS

Li, Wong and Mann, Organization of Inorganic Nanoparticles Using Biotin-Streptavidin Connectors, Chem. Mater. Nov. 23-26, 1999.*
Schapotschnikow et al., Understanding interactions between capped nanocrystals: Three-body and chain packing effects, J. Chem. Phys. 131, 124705 (2009)I.*
Kiely et al., Ordered Colloidal Nanoalloy, Adv. Mat., vol. 12, No. 9, 640-643 (2000).*
Mlrkin et al., A DNA-based method for rationally assembling nanoparticles into macroscopic materials, Nature, vol. 382, 607-609, Aug. 1996.*

* cited by examiner

*Primary Examiner* — Hoa (Holly) Le
(74) *Attorney, Agent, or Firm* — Norma E. Henderson

(57) ABSTRACT

Fabrication and arrangement of nanoparticles into one-dimensional linear chains is achieved by successive chemical reactions, each reaction adding one or more nanoparticles by building onto exposed, unprotected linker functionalities. Optionally, protecting groups may be used to control and organize growth. Nanoparticle spheres are functionalized in a controlled manner in order to enable covalent linkages. Functionalization of nanoparticles is accomplished by either ligand exchange or chemical modification of the terminal functional groups of the capping ligand. Nanoparticle chains are obtained by a variety of connectivity modes such as direct coupling, use of linker molecules, and use of linear polymeric templates. In particular, a versatile building block system is obtained through controlled monofunctionalization of nanoparticles.

7 Claims, 16 Drawing Sheets

PREPARATION OF NANOPARTICLE CHAINS COMPRISING REACTING OF FUNCTIONAL GROUPS

RELATED APPLICATIONS

This application is a divisional application of U.S. patent application Ser. No. 10/621,790, filed Jul. 17, 2003, now U.S. Pat. No. 7,476,442, which claims the benefit of U.S. Provisional Application Ser. No. 60/396,337, filed Jul. 17, 2002, the entire disclosures of which are each herein incorporated by reference.

FIELD OF THE INVENTION

This invention relates to synthesis of nanoparticles and their assemblies and, in particular, to controlled synthesis of functionalized nanoparticles, nanoparticle assemblies, and nanoparticle chains.

BACKGROUND

Inorganic nanoparticles, nanoclusters, and colloids have become a subject of intensive research and offer a great many potential uses if their size, ligand sphere, and positioning can be reliably controlled (Shipway A. N. et al., *Chem Phys Chem.* 1: 18-52 (2000)). A variety of devices can be envisioned, ranging from specialized nanosensors to molecular electronics and nanoscale optical devices. Many such applications are not presently practical due to the lack of appropriate methods for synthesis of nanoparticle chains and for fabrication of nanoparticle chains into a circuit.

Numerous approaches to synthesis of nanoparticles exist, including pyrolysis of organometallic precursors, arrested precipitation, precipitation in reverse micelles, and exchange (metathesis) reactions. Because nanoparticle properties depend strongly on size, shape, crystallinity, and surface derivatization, the particle synthesis is normally tailored to control these parameters for a particular application. In general, if the nanoparticles are intended to be utilized in their native particulate state without any fusion into bulk material (agglomeration), then any synthetic method yielding appropriate size control and crystallinity may be utilized (Jacobson et al, U.S. Pat. No. 6,294,401 (2001)).

Because of this, current synthetic methods for nanoparticles are largely concerned with obtaining size control and a viable synthesis of the desired compound (Schmid et al., *Adv. Mater.* 10: 515-526 (1998)). Syntheses have been designed to incorporate ligands with supramolecular functionality, with the aim of connecting one nanoparticle to another molecular entity or nanoparticle (Loweth et al., *Angew. Chem. Int. Ed.* 38, 1808-1812 (1999); Boal et al., *J. Amer. Chem. Soc.* 122: 734 (2000); Liu et al., *Adv. Mater.* 12: 1381-1383 (2000); Mann et al., *Adv. Mater.* 12: 147 (2000); Novak et al., *J. Amer. Chem. Soc.* 122: 3979-3980 (2000)). For example, monofunctional gold nanoparticles have been produced by statistical ligand exchange reactions, which is a very difficult task requiring subsequent extensive purification and separation steps, such as high-performance liquid chromatography (U.S. Pat. No. 5,360,895, Hainfeld et al. (1994), U.S. Pat. No. 5,521,289, Hainfeld et al. (1996), U.S. Pat. No. 6,121,425, Hainfeld et al. (2000)).

Biological techniques have been found to be useful in directing synthesis of inorganic materials (Storhoff et al., *Chem. Rev.* 99: 1849-1862 (1999); Lee et al., *Science,* 296, 892-895 (2002)). The realm of biology offers examples of both controlled nanoparticle synthesis and the building of elaborate functional structures by the use of polymers. For example, ferritin is a cage-like nanoparticle of a specific size that can be synthesized in a controlled fashion. Ferritin and similar structures have been used in the synthesis of nanoparticles of well-controlled size (Mukherjee et al., *Angew. Chem. Int. Ed.* 40: 3585 (2001); Shenton et al., *Angew. Chem. Int. Ed.* 40: 442-445 (2001)). Biology also offers a number of diverse processes that can be carried out by polymeric chains such as, for example, peptide and nucleotide chains. Attempts have also been made to utilize biological motifs to control the relative positioning of nanoparticles (Lee et al., *Science,* 296, 892-895 (2002)).

Nanoparticles fall into two general categories: charge-stabilized colloids and 'molecularly' soluble colloids/chemical entities. Charge-stabilized colloids are typically synthesized in polar media. Although charge-stabilized colloids are thermodynamically unstable due to high surface energy, they maintain their small size by electrostatic repulsion. Kinetically, charge-stabilized colloids are very unlikely to agglomerate.

Agglomeration of molecularly soluble nanoparticles can typically be avoided by modifying the entropy, solvation energy, and/or steric shielding of the nanoparticles. These modifications are generally accomplished by the use of organic ligands, which allows fine-tuning of solubility for various solvents. The bond strength of the ligands to a nanoparticle typically varies from low strength Lewis acid—Lewis base interactions to higher-strength covalent bonds.

Most ligands are quite mobile within the ligand sphere of a nanoparticle and can migrate from one side of a nanoparticle to another. Therefore, while two ligands may be on opposite sides of a nanoparticle initially, they can migrate to the same side of the particle over time, especially when there is an attractive interaction (Boal et al., *J. Amer. Chem. Soc.* 122: 734 (2000). Migration of ligands can interfere with building complex supramolecular structures out of nanoparticles. Further, because the ligand sphere is not rigid, the ligand-particle-ligand 'bond angle' is not fixed for any two ligands on the particle. As a result, the ligands are free to move around, which can destroy the desired supramolecular effect.

What has been needed, therefore, are generalized coupling chemistries that allow buildup of arbitrary chains of nanoparticles in a polymeric fashion. Methods of nanoparticle synthesis are therefore needed that allow for the reliable incorporation into the nanoparticle ligand sphere of functionality through specifically designed chemically reactive sites.

SUMMARY

These and other objectives are met by the present invention, which relates to the creation of polymers and other supramolecular structures containing nanoparticles. Using the present invention, nanoparticles are incorporated into the structure when the polymer chain is synthesized, rather than as a post-polymerization modification. In the method of the present invention, nanoparticles are assembled into structures by successive chemical reactions, with each reaction adding one or more nanoparticles by building onto exposed, unprotected linker functionalities. Protecting groups may optionally be used to control and organize growth.

In one aspect, the invention is a method for functionalization of nanoparticles in a controlled fashion. Chemical properties of nanoparticles are modified by monodentate ligands, normally used in the synthesis of nanoparticle precursors, and/or by ligands that are customized to include a functional group utilized for linking chemistry in nanoparticle assembly.

In particular, a versatile building block system is obtained through controlled monofunctionalization of nanoparticles.

A preferred embodiment of the invention relies upon capture of a monofunctionalized nanoparticle ligand shell by initiation of polymerization. The ligand exchange reaction takes place through addition of a new ligand, followed by dissociation of an old ligand. The ligand shell is thereby captured in a monofunctionalized state. As soon as the new ligand enters the ligand shell of the nanoparticle, it initiates a polymerization reaction that involves the whole of the ligand shell, preventing further ligand exchange processes from occurring.

In another aspect, the invention features structures and syntheses of families of linker ligands useful in the stepwise assembly of nanoparticle structures. In one embodiment, the linker ligands have multiple arms terminating either in chemical functionalities that anchor the ligand to the surface of a nanop article or in linker functionality that is used to link up nanoparticles into chains or other structures.

In yet another aspect, the present invention features structures and syntheses of the nanoparticle/linker ligand building blocks. In one embodiment, nanoparticle precursors, mixtures of ligands, and linker moiety precursors are directly used in the synthesis. The size of the nanoparticles may be optionally controlled and stabilized by using wrapping linker moieties. Synthesis may alternatively be accomplished by either ligand exchange reactions in solution or capture of gas phase particles, using the linker moieties. In any of these syntheses, the number of linking ligands per nanoparticle is crucial, and can be controlled by varying synthetic conditions and/or by a number of purification means.

In yet another aspect, the invention features syntheses of polymers through using nanoparticle/linker building blocks (e.g., chains of nanoparticles). In one embodiment, synthesis of polymeric chains is accomplished by using stepwise polymerization reactions with appropriate linker moieties, akin to oligopeptide synthesis. The synthesis may alternatively utilize chain polymerization reactions by choosing appropriate linker moieties that are used for peptide linkage.

DETAILED DESCRIPTION

Figure 1A:
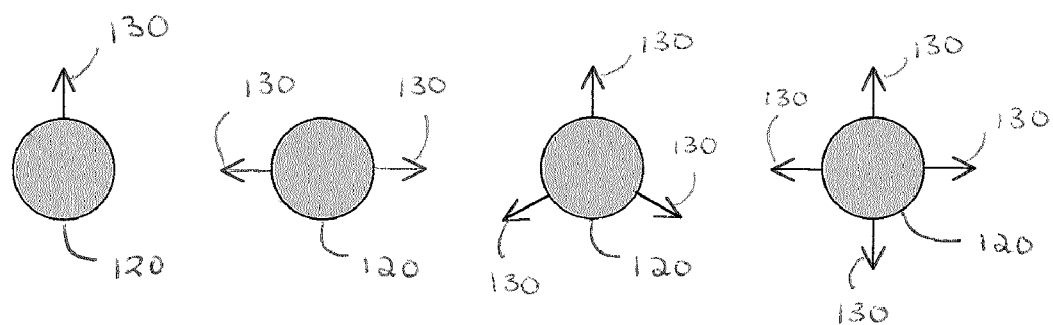
FIG. 1A illustrates one possible linker geometry according to the present invention, having symmetrically spaced linking groups arranged around arbitrary nanoparticle building blocks.

The present invention relates to the creation of polymers and other supramolecular structures containing nanoparticles and nanoclusters. Using the present invention, nanoparticles are incorporated into the structure when the polymer chain is synthesized, rather than as a post-polymerization modification.

In one aspect, the present invention is a method for functionalization of nanoparticles in a controlled fashion. Chemical properties of nanoparticles are modified by a set of ligands composed of monodentate ligands, normally used in synthesis of nanoparticle precursors, and ligands customized to have a functional group utilized for linking chemistry in nanoparticle assembly. In certain applications, only linker ligands are used. Typically, use of only one, or possibly only a few, linker ligands is preferred on each nanoparticle or nanocluster, allowing for spatial and geometric control over the orientations of the linker moieties. Alternatively, a single large ligand designed to present several linker moieties at spatially separate locations on the ligand sphere can be used.

In another aspect, the present invention features structures and syntheses of families of linker ligands useful in the stepwise assembly of nanoparticle structures. In one embodiment, the linker ligands have multiple arms terminating in chemical functionalities, such as chelating groups, which anchor a ligand to the surface of a nanoparticle. One or more arms may alternatively terminate in linker functionality, which is used to link up nanoparticles into chains or other structures by reaction with linker groups bound to other nanoparticles. If desired, the linker ligands may have chiral centers.

In yet another aspect, the present invention features structures and syntheses of nanoparticle/linker ligand building blocks. In one embodiment, nanoparticle precursors, mixtures of ligands, and linker moiety precursors are directly used in the synthesis. The size of the nanoparticles may optionally be controlled and stabilized by using wrapping linker moieties. These nanoparticles can then be used to build nanoparticle structures as described herein. Synthesis may alternatively be accomplished by ligand exchange reactions in solution or by capture of gas phase particles, using the linker moieties. In any of these syntheses, the number of linking ligands per nanoparticle is crucial, and can be controlled by varying the synthetic conditions and/or by a number of purification means including, but not limited to, precipitation, chromatography, centrifugation, extraction, crystallization, and titration.

In yet another aspect, the present invention features syntheses of polymers by using nanoparticle/linker building blocks (e.g., chains of nanoparticles). In part, this invention mimics the functionality of biological processes in nanoparticle assembly. In one embodiment, synthesis of polymeric chains is accomplished by using stepwise polymerization reactions with appropriate linker moieties, akin to oligopeptide synthesis. The synthesis may alternatively employ chain polymerization reactions by choosing appropriate linker moieties, such as terminal amino acid groups, that are used for peptide linkage.

In the method of the present invention, nanoparticles are assembled by successive chemical reactions, each reaction adding one or more nanoparticles by building onto exposed, unprotected linker functionalities. Optionally, protecting groups may be used to control and organize growth. This approach allows for a greater diversity of structures to be built. In order to produce nanoparticle assemblies with chirality, the linker arms may themselves be chiral. This overall approach may further be used in conjunction with solid-phase techniques, resembling certain methods of synthesizing of oligonucleotides or oligopeptides.

Overview. A preferred embodiment of the invention involves controlled placement, with fixed geometry, of linking groups around a nanoparticle. Each linking group may optionally have a different functional reactivity, rendering the linking moieties chemically non-interfering and allowing the resulting nanoparticle building block to maintain versatility. Also preferably, each linking group is equidistant from the surface of the nanoparticle. The size of the nanoparticle may optionally be controlled by linker ligands, either during synthesis or afterwards. The linker ligands employed are preferably compatible with a wide variety of nanoparticle elemental compositions.

Figure 1B:
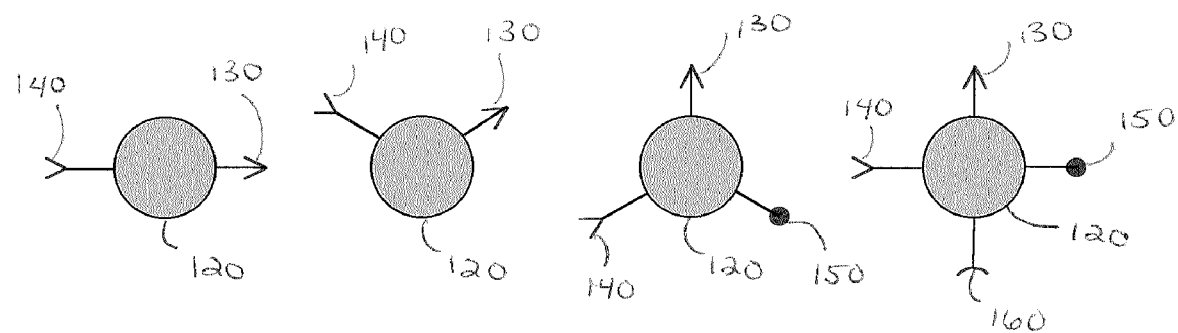
FIG. 1B illustrates another possible linker geometry according to the present invention, having diverse chemical moieties that can form covalent bonds with suitable partner functionalities linked around arbitrary nanoparticle building blocks.

FIGS. 1A and 1B illustrate some of the variety of possible linker geometries and a number of linking groups, such as linker ligands, around arbitrary nanoparticle building blocks 120. Nanoparticle building blocks 120 are shown as spherical only for convenience; they may take any other three-dimensional shape. For example, triangles, rods, cubes, vertex-truncated cubes, and tripods are rare, but occasionally occurring, shapes for nanoparticles. The sizes of the linking groups are exaggerated in FIGS. 1A and 1B in order to illustrate potential stereochemistries around the particle.

Any number of distinct linkers may fill the role of linking group. For example, supramolecular structures may be built in a controlled fashion by use of chemically orthogonal linking groups. Controlled chain catenation may also be achieved through the use of different protecting group functionalities, which may be selectively (and separately) removed or deactivated. Use of these and similar procedures allows synthesis of a diverse set of structures.

In FIG. 1A, nanoparticles 120 have been treated with only one specific functional ligand, resulting in symmetrically spaced linking groups 130. Mono- to multifunctionalization of the ligand sphere can be achieved by stoichiometric ligand exchange reaction of an inert nanoparticle. On the other hand, as shown in FIG. 1B, diverse chemical moieties 130, 140, 150, 160 can form covalent bonds with suitable partner functionalities. For example, amide linkages can be formed when a nanoparticle has both carboxylate and amine functional groups. Under amide bond forming conditions, other functional groups are preferably inert and may be, for example, Heck coupling partners.

Figure 2A:
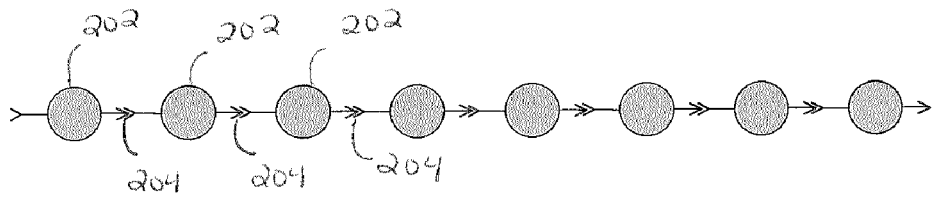
FIG. 2A depicts one structure of supramolecular nanoparticles that may be formed from nanoparticle building blocks according to the present invention, a linear oligomeric chain containing one specific nanoparticle building block.
Figure 2B:
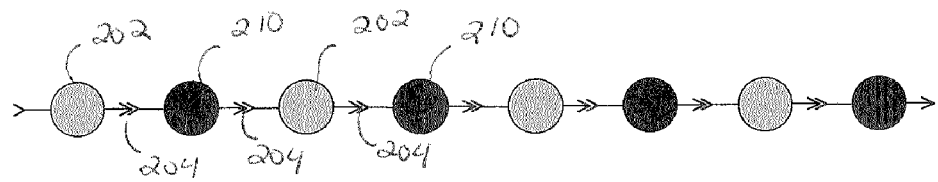
FIG. 2B depicts an oligomeric chain having alternating nanoparticle types.
Figure 2C:
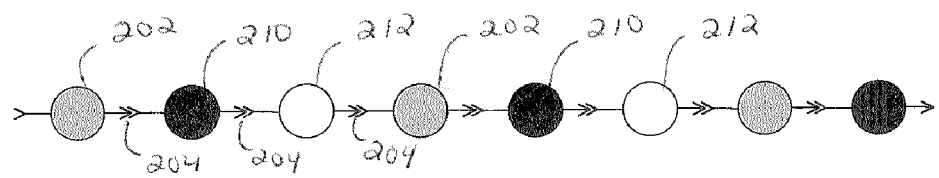
FIG. 2C depicts an oligomeric chain having three alternating nanoparticle types.
Figure 2D:
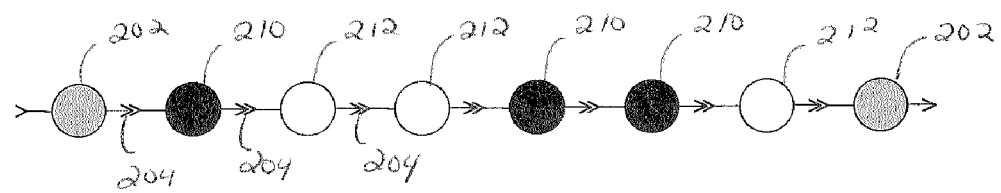
FIG. 2D depicts an oligomeric chain having a defined sequence of nanoparticle types.
Figure 2E:
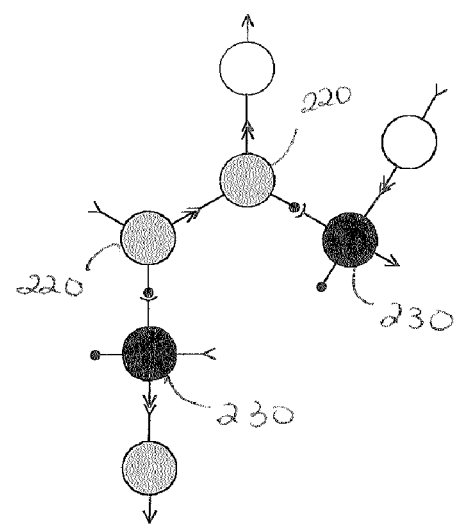
FIG. 2E depicts a nanoparticle assembly having trigonal and tetragonal building blocks.

FIGS. 2A to 2E depict several exemplary structures of supramolecular nanoparticles that may be formed from the building blocks shown in FIGS. 1A and 1B. Any of the various possible connections may be made between the nanoparticles. FIGS. 2A to 2D depict several of the possible kinds of linear oligomeric chains containing nanoparticles of a defined length. The chains may also be a polydisperse polymer formed by either a standard step-growth or chain-growth type polymerization the two types of polymerization mechanisms by which all polymers are formed. FIG. 2A depicts the simplest chain system, having one specific nanoparticle building block 202 in which the connection is made through direct coupling 204. FIG. 2B depicts an oligomer with alternating nanoparticle types 202, 210. FIG. 2C depicts an oligomer with three alternating nanoparticle types 202, 210, 212. FIG. 2D depicts an oligomer with a defined sequence of nanoparticle types 202, 210, 212. An oligomer/polymer of random sequence may also be synthesized from the same building blocks. FIG. 2E depicts an example of a more elaborate structure using trigonal 220 and tetragonal 230 building blocks.

Figure 3:
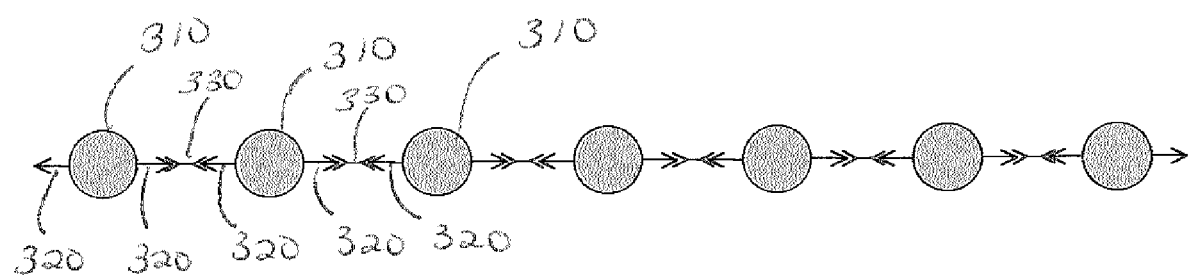
FIG. 3 depicts a disubstituted nanoparticle having two terminal carboxylate groups pointing in opposite directions that may form a covalent bond.

In one specific embodiment, the nanoparticles depicted in FIG. 1A are readily treated by one-step ligand exchange in order to generate higher symmetry. While the degree of complexity per nanoparticle of FIG. 1A is lower than for those depicted in FIG. 1B, synthetic effort is minimized, and they are obtainable by a straightforward method. To accomplish a chain-forming reaction using these nanoparticles, another molecular linker component is used. For example, as shown in FIG. 3, a disubstituted nanoparticle 310 having two terminal carboxylate groups 320 pointing in opposite directions may form a covalent bond with a symmetrical diamine 330 such as, for example, ethylenediamine.

Figure 4A:
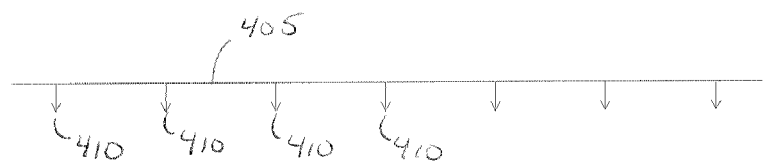
FIG. 4A depicts a class of nanoparticle chain system consisting of a preexisting oligo- or polymer template and nanoparticles having uniformly spaced functional linking groups.
Figure 4B:
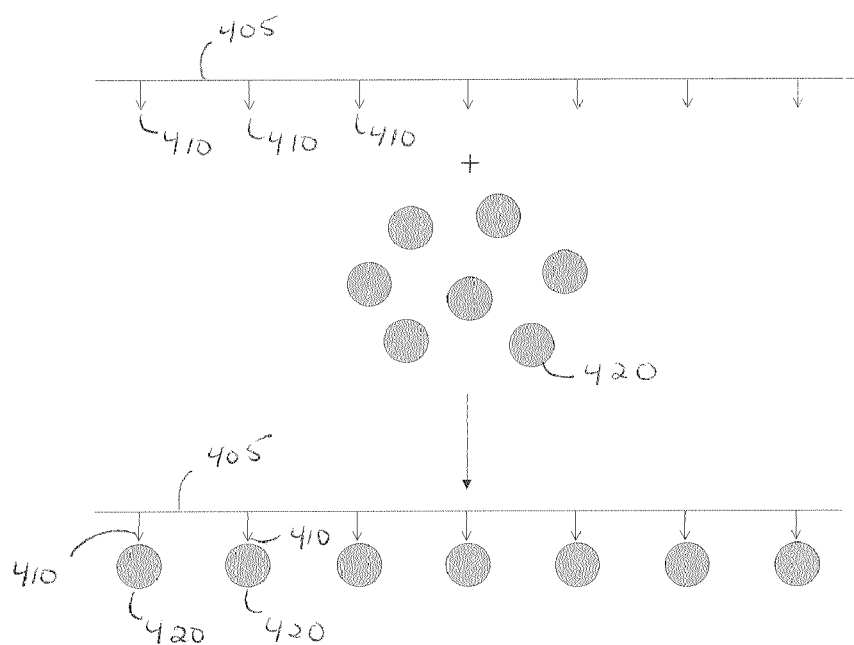
FIG. 4B shows that attachment of nanoparticles on the polymer may be achieved by ligand exchange leading to direct bonding of the linker functional arm and the nanoparticle core.
Figure 4C:
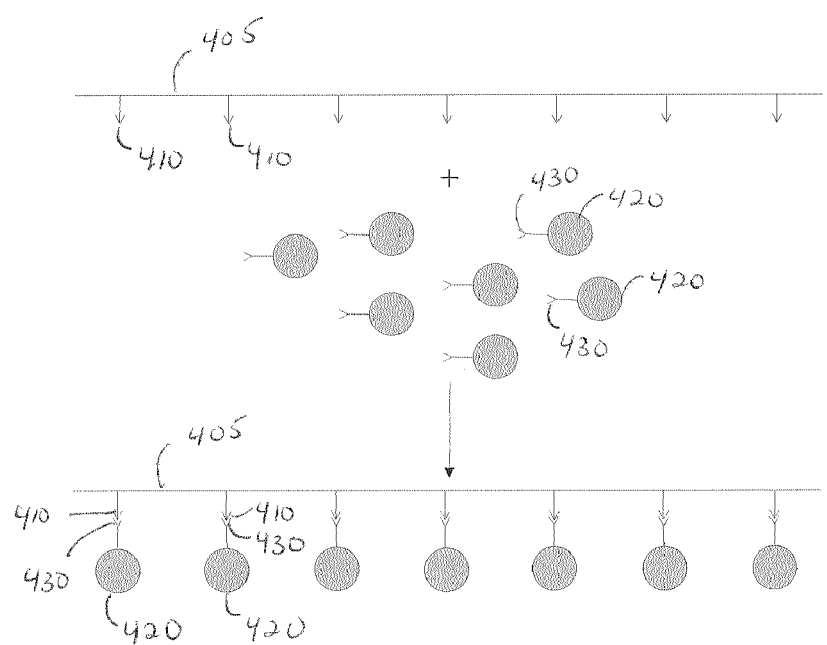
FIG. 4C depicts an alternate method, covalent linkage between the linker functional arm and the functionalized nanoparticle.

Another possible class of nanoparticle chain system consists of a preexisting oligo- or polymer template and nanoparticles, as shown in FIGS. 4A to 4C.

FIG. 4A illustrates a schematic linear polymer chain 405 containing uniformly spaced functional linking groups 410. The polymer 405 is generally required to be of sufficiently large molecular weight compared to the nanoparticles to allow the stoichiometry to be precisely controlled. Moreover, the branching functional arms 410 should be spaced a sufficiently large distance between the two adjacent groups. For example, to accommodate gold nanoparticles sized 1.5-2 nm evenly through one ligation per particle, the functional arm distances should be greater than 2 nm. The loading level of the functional groups on the polymer chain can be controlled by any of the well-known methods in the art.

FIG. 4B shows that attachment of nanoparticles 420 on the polymer 405 may be achieved by ligand exchange leading to a direct bonding of the functional arm 410 and the nanoparticle core. Covalent linkage between the arm 410 and monofunctionalized nanoparticle 420 is an alternative method, as shown in FIG. 4C. For example, if the arms 410 on the polymer have a terminal amine, they can be linked to monocarboxylic acid 430 on nanoparticles 420. In this case, the functional arm spacing is less important, due to the fact that the availability of covalent linkage per nanoparticle is only one (Harth et al., *J. Amer. Chem. Soc.* 124: 8653-8660(2002); Boal et al., *Nature* 404: 746-748(2000); Boal et al., *Adv. Functional Mat.* 11(6): 461-465(2001).

Functionalization of nanoparticles. In one aspect, the invention is a method for assembly of nanoparticles in a controlled fashion. Chemical properties of nanoparticles are modified by a set of ligands, and the resulting nanoparticle building blocks are then assembled by successive chemical reactions, with each reaction adding one or more particles by building onto exposed, unprotected linker functionalities. Protecting group chemistry may optionally be employed in order to provide added versatility in the structures that can be built. In particular, several kinds of orthogonal linker chemistries may be employed in the same system, allowing a greater diversity of structures to be built. In some embodiments, the invention may use chiral linker arms to produce nanoparticle assemblies with chirality and/or more elaborate structures.

In one implementation, the method utilizes solubilization of nanoparticles by lyophilic ligand spheres using any suitable methodology known in the art (but typically not by electrostatic mechanisms). Solubility of nanoparticles in various solvent media having a large range of polarities is subject to completely controllable modulation. For instance, classical gold nanoparticles protected by a normal alkanethiolate monolayer are generally soluble in non-polar organic solvents such as n-alkanes, toluene, THF, and diethyl ether (Brust et al., *J. Chem. Soc. Chem. Commun.* 801 (1994)). Displacing of this alkanethiolate monolayer with hydrophilic functional group-terminating thiols produces water-soluble nanoparticle systems (Simard, J., *J. Chem. Soc. Chem. Commun.* 1943 (2000)).

The invention includes structures and synthesis of families of linker ligands useful in the stepwise assembly of nanoparticle structures. Each family of linker ligands is based upon a specific linker group, such as a carboxylic acid or amine. The members of each family are designed for distinct nanoparticle elemental compositions. For example, nanoparticle elemental compositions may include Au, Ag, Pt, Ti, Al, Si, Ge, Cu, Cr, W, Fe, and their corresponding oxides. In addition, group III-V and II-VI semiconductors, such as CdSe, CdS, CdTe, and GaAs, can be used to prepare nanoparticles. In some embodiments, the invention may be practiced in conjunction with solid-phase techniques, in a manner resembling the methods by which oligonucleotides or oligopeptides are built up.

In one embodiment, the linker ligands have multiple arms terminating in chemical functionalities, such as chelating groups, tailored for the specific nanoparticle chemistry to be used to anchor the ligand to the surface of the nanoparticle. One or more arms may additionally terminate in linker functionality, which is used to link nanoparticles into chains or other structures by reaction with linker groups bound to other nanoparticles. If desired, the linker ligands may have chiral centers.

Figure 5A:
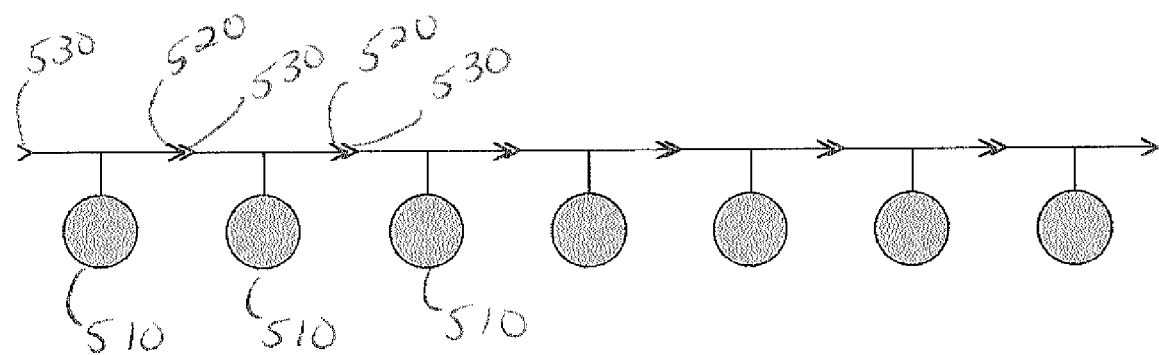
FIG. 5A depicts oligo- or polymerization of monofunctionalized nanoparticles according to the present invention, having nanoparticle building blocks directly coupling to one another at preexisting monofunctionalized oligomeric moieties.
Figure 5B:
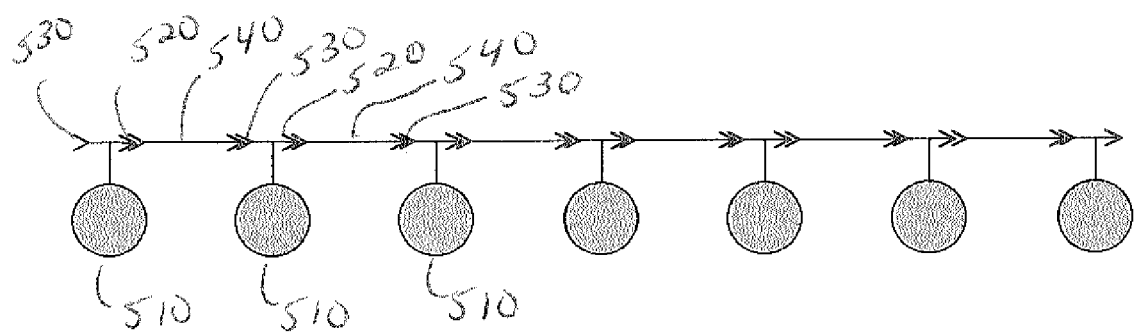
FIG. 5B depicts an alternative oligo- or polymerization of monofunctionalized nanoparticles according to the present invention, having nanoparticle building blocks alternatively coupling through use of a small linking functional group.

In one embodiment of the present invention, nanoparticle-branched chains of the type depicted in FIGS. 4A to 4C are expanded by oligo- or polymerization of monofunctionalized nanoparticles, as shown in FIGS. 5A and B. Nanoparticle building blocks 510 in FIG. 5A directly couple to one another at preexisting monofunctionalized oligomeric moieties 520, 530 that relieve steric hindrances. Alternatively, as shown in FIG. 5B, a versatile system employs a small linking functional group 540 such as an amino acid. Sequential peptide synthesis using this monofunctionalized amino acid-nanoparticle, in addition to the 20 natural amino acids, may be used to produce an elaborate one-dimensional nanoparticle chain system.

Stoichiometric ligand exchange or chemical modification for monofunctionalized nanoparticles usually produces not only mono-, but also di-, tri-, tetrafunctionalized nanoparticles, etc. A preparation and purification method for monofunctionalized gold particles has been previously reported (See Hainfeld et al., U.S. Pat. Nos. 5,360,895; 6,121,425 (1994; 2000)), but requires use of an extensive HPLC separation technique that may present difficulties in identification of the number of activated functional groups by either spectroscopic or microscopic techniques. The process of Hainfeld et al also lowers the product yield significantly. In contrast, the present invention provides facile purification and preparation methods that can reduce the effort required for purification.

By way of example, in one embodiment the mixture of mono- to multifunctionalized nanoparticles is treated with a slight excess of bridging linker molecules in order to make dimer, trimer and tetramer nanoparticles. Because the resulting nanoparticle dimers and other nanoparticle aggregates have multiplicative molecular weights, the sedimentation equilibrium factors are changed and ultracentrifugation generates a sedimentation gradient that depends on the degree of aggregation. Dimer species formed by two monofunctionalized nanoparticles can be physically separated and identified by electron microscopic technique such as transmission electron microscopy. The separated dimers are then subjected to a linkage breaking reaction in order to release the monofunctionalized nanoparticles.

Figure 6:
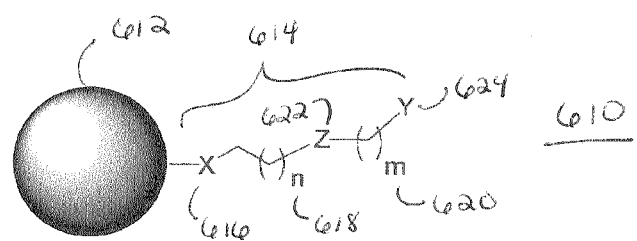
FIG. 6 depicts two exemplary components of a system according to the present invention for producing monofunctionalized nanoparticles by 'capturing' of the monofunctionalized ligand sphere through a polymerization mechanism.
Figure 6:
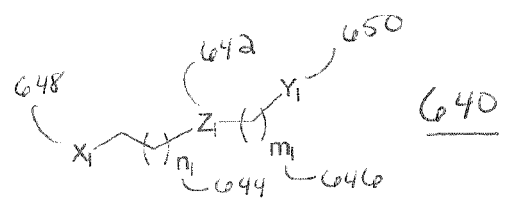

One embodiment of the method of the present invention, used for monofunctionalizing a nanoparticle, is shown in FIG. 6. This embodiment relies upon capture of the monofunctionalized nanoparticle ligand shell by initiation of polymerization. The ligand exchange reaction takes place by addition of a new ligand, followed by dissociation of an old ligand. The ligand shell is thereby captured in a monofunctionalized state. As soon as the new ligand enters the ligand shell of the nanoparticle, it initiates a polymerization reaction. This polymerization reaction involves the whole of the ligand shell, preventing further ligand exchange processes from occurring.

The rate of the ligand exchange reaction can be controlled via concentration, so that the polymerization reaction occurs much more quickly than the addition of a second ligand to the nanoparticle shell. In this way, more than one new ligand is not added before a 'locking in' of the ligand shell structure. These new ligands contain at one terminus a linking moiety for further manipulation of the monofunctionalized nanoparticles. This method ensures the monofunctionalization of the nanoparticle ligand shell and does not involve extensive purification, making it particularly desirable.

FIG. 6 depicts two example components of a system designed to produce monofunctionalized nanoparticles 610 by 'capturing' of the monofunctionalized ligand sphere through a polymerization mechanism. One component is a metal or semiconducting nanoparticle 612 that has been synthesized using ligand 614. The metals and semiconductors of nanoparticle 612 could be, for instance, Au, Ag, Cu, Pt, Pd, Ir, CdS, ZnS, ZnO, CdSe, CdTe, or any other suitable material. Ligand 614 contains several elements. A linking Lewis base moiety X 616 is typically necessary for nanoparticle formation, control of nanoparticle size, and agglomeration prevention, providing for stabilization of metallic or semiconductor nanoparticle 612. Lewis base moiety X 616 is often sulfur, though it can consist of atoms such as Se, Te, P (particularly semiconducting particles), N (particularly semiconducting particles), or Lewis basic organic groups such as carboxylic acid.

Methylene spacers (methylene linking units) n 618 and m 620, located before and after a polymerizable moiety Z 622, help to form a reasonable monolayer covering the nanoparticle and spatially provide a 'hold-off' zone around the nanoparticle, providing it with kinetic stability and thereby preventing agglomeration. By way of example, the spacer length m and n could be 0-20 methylene units. Typically, the overall length of a stabilizing ligand around a metal nanoparticle, such as ligand 614, is 1 or more nanometers.

Polymerizable moiety Z 622 is designed to polymerize once a single 'polymerizing ligand' is place-exchanged onto the ligand shell surrounding nanoparticle 612. The polymerization reaction locks the ligand shell into place around the nanoparticle, stabilizing it and preventing further ligand exchange. Thus, once a single polymerizing ligand enters the nanoparticle ligand shell, the polymerization reaction occurs rapidly, before a second ligand exchange reaction can occur. The polymerization reaction will be favored through proximity effects, so polymerizations that might be 'poor' polymerizations for making long polymer chains will still sufficiently polymerize a ligand shell because it is a preoganized system due to bonding to nanoparticle 612. Polymerization may occur by anionic mechanisms (such as olefin, acetylene, or nucleophilic ring opening), radical mechanisms, carbonyl addition mechanisms (such as acetal-type polymerization), or cationic mechanisms.

Preferred suitable polymerizable moieties include —C=C—, —C=C—C=C—, —C≡C—, —C≡C—C≡C—, —CO— (ketone), —CS— (thioketone), —CSe— (selenoketone), acetal, thioacetal, epoxides, thiiranes (episulfides), and certain compounds with methyl activating groups, but any other suitable polymerizable moieties known in the art may be advantageously employed in the present invention. Possible polymerizable moieties also include two or more polymerizable groups, in order to provide a higher degree of cross-linking with the nanoparticle shell.

Exposed terminating group Y 624 on stabilizing ligand 614 can be used to control the solubility characteristics of the nanoparticle. Exposed terminating group Y 624 may be —CH$_3$, —COOH, —CONH$_2$, —COH, fluorinated methylene chains or other groups that provide desired solubility while still allowing for nanoparticle formation, or any other suitable group known in the art.

FIG. 6 further depicts 'polymerizing' ligand 640. Ligand 640 is designed to undergo place exchange reactions with nanoparticle system 610. It shares many features with ligand 612 attached to nanoparticle 614. The main difference is that polymerizing ligand 640 contains polymerization initiation moiety $Z_1$ 642, which is designed to initiate polymerization once it enters the nanoparticle ligand shell through a place exchange reaction. Polymerization initiating moiety $Z_1$ 642 is at the same approximate position with respect to the radius extending from the nanoparticle center as polymerizable moiety $Z_1$ 622, being surrounded by linking methylene units $n_1$ 644 and $m_1$ 646. Polymerization initiating moiety $Z_1$ 642 may be —NH—, —S—, —Se—, —Te—, —PH—, —CO—, —COO—, —CONH—, —PR$_2$, where R$_2$ is -methyl, —O, —NH, or any other suitable moiety known in the art.

Polymerization may be initiated simply by the proximity of the newly added 'polymerizing' ligand, or by an external signal such as photons. Polymerization initiators such as Lewis basic groups like amines are favorable, since they react mainly by a proximity effect. However, groups such as ketones may also be used, through photochemical generation of radical pairs followed by capture of this excited state via olefins, acetylenes, or other carbonyl compounds.

In the embodiment depicted in FIG. 6, polymerizing ligand 640 further contains attachment moiety $X_1$ 648 at one terminus, for attachment to nanoparticle 612. Typically, attachment moiety $X_1$ 648 is a Lewis basic moiety, in order to provide stabilization of the metallic or semiconductor nanoparticle 612, but any suitable moiety may be utilized.

Polymerization initiating ligand 640 contains linking moiety $Y_1$ 650 at the other terminus, allowing for further reactions involving the nanoparticle. For instance, the nanoparticle may be attached to other molecules that might themselves have several protected linker chemistries embedded. Suitable functional linking moieties include, but are not limited to, —COOH—, —CONH$_2$, —COH, —CH$_2$OH, —CH$_2$OR$_3$ (where R$_3$ is a protecting group), olefin, alkynyl, —COOR$_4$ (where R$_4$ is an alkyl or a protecting group), and any group that will provide the desired linking chemistry after the monofunctionalization reaction.

Assembly of nanoparticle building blocks. In the method of the present invention, the nanoparticle building blocks are assembled by successive chemical reactions, each reaction adding one or more nanoparticles by building onto exposed, unprotected linker functionalities. Protecting groups may optionally be used to control and organize growth. Several kinds of linker chemistries, which may be chemically 'orthogonal' in the sense of having different, non-interfering, non-complementary reactivities, may be used in the same system (See, e.g., U.S. Pat. No. 5,310,869, Lewis et al. (1994)).

For example, alpha olefin functional groups with up to 18 carbons can be advantageously employed in a hydrosilylation reaction (using catalytic platinum, for example) in which a silicon hydride-functional cross-linking species, such as a polymethylhydrosiloxane polymer, copolymer or terpolymer, or a polyfunctional polysilane, is employed. Likewise, many modern carbometallation reactions that create carbon-carbon bonds can be performed under mild conditions that will not interfere with a wide variety of functional groups, such as amide bonds. For example, an aryl bromide functionality can be reacted with an olefin (Heck coupling) or acetylene (Sonagashira coupling) in the presence of a palladium catalyst. Such reactions can be carried out under mild conditions in the presence of protected amines and carboxylic acids (protected or unprotected). Likewise, the amide-coupling chemistries utilizing activating agents such as DCC (dicyclohexylcarbodiimide in organic media), EDC (1-Ethyl-3-(3-dimethylaminopropyl)-carbodiimide, in aqueous media), BOP (benzotriazole-1-yl-oxy-tris-(dimethylamino)-phosphonium hexafluorophosphate), and HBTU (o-benzotriazole-N,N,N',N'-tetramethyl-uronium-hexafluorophosphate) are compatible with the presence of olefins, acetylenes, and aryl halides.

In one aspect, the present invention includes the creation of families of ligands that can be used to construct supramolecular entities, such as nanoparticle chains, out of nanoparticle building blocks, such as ligands and nanoparticle entities or precursors. In one embodiment, ligands are prepared that can wrap around an entire nanoparticle, or part of a nanoparticle. The ligands are used as scaffolds upon which to place suitable linking functionalities and, optionally, protecting groups. Rigidity of the wrapping ligand allows for control and maintenance of linker geometries. If two wrapping ligands are on one nanoparticle, these two ligands can be made sufficiently bulky to prevent the linker 'arms' of the ligands from interacting.

In various embodiments of the invention, ligand spheres may comprise typical monodentate ligands normally used in synthesis of the given nanoparticle and/or custom-designed ligands containing linking chemistry for assembly. In some embodiments, only linker ligands are present. Typically, two or more linker ligands are preferred on each nanoparticle or nanocluster, providing spatial and geometric control over the orientations of the linker moieties. Alternatively, it may be desirable to use one ligand designed to present several linker moieties at spatially separate locations on the ligand sphere. In some embodiments, nanoparticle/linker-ligand building blocks are obtained by direct synthesis using nanoparticle precursors, mixtures of standard ligands as well as linker ligands, or only linking ligands. Wrapping linker ligands may optionally be used to control and/or stabilize the sizes of nanoparticles.

In another aspect, the present invention features structures and syntheses of the nanoparticle/linker ligand building blocks. In one embodiment, nanoparticle precursors, mixtures of ligands, and linker moiety precursors are directly used in the synthesis. The size of nanoparticles may be optionally controlled and stabilized using wrapping linker moieties. For example, hydrogen tetrachloroaurate may be mixed with a reducing agent such as sodium borohydride, in the presence of linking ligands and, optionally, certain inert ligands (e.g., alkyl thiols or alkyl amines), as well as an appropriate solvent. The resulting gold nanoparticles exhibit size selectivity and incorporate the linking ligands. These nanoparticles can then be used to build nanoparticle structures as described herein.

Synthesis may alternatively be accomplished by ligand exchange reactions in solution using the linker moieties. In this procedure, an already-synthesized nanoparticle bearing stabilizing ligands is subjected to an excess of the desired linking ligand. Substitution of the linking ligand occurs, displacing the stabilizing ligand. In a similar manner, synthesis may alternatively be accomplished by capture of electrostatically stabilized particles using the linker moieties. Synthesis may also be accomplished by capture of gas phase particles using the linker moieties. In any of the described methods of synthesis, the number of linking ligands per nanoparticle is crucial and can be controlled by varying the synthetic conditions and/or by a number of purification means including, but not limited to, precipitation, chromatography, centrifugation, extraction, crystallization, and titration.

In some embodiments, nanoparticle/linker-ligand building blocks are obtained by synthesis using place-exchange reactions in solution, using the linker ligands to replace inert stabilizing ligands around the nanoparticle with the desired linking ligands. In other embodiments, the building blocks may be obtained by capture of electrostatically stabilized particles using the linker ligands, possibly in combination with inert ligands. The nanoparticle/linker-ligand building blocks may be employed in the synthesis of polymers, by using, for example, step-polymerization reactions or chain-polymerization reactions in conjunction with appropriate linker chemistries.

FIGS. 7A and 8-10 depict various exemplary ligand designs useful in practicing the present invention. Ligands may have multiple 'arms' that can bind the nanoparticle through, for example, Lewis basic chelating groups. The linker ligands depicted typically have several thiols (for noble metal nanoparticles) or other Lewis basic groups that provide the bond between the linking ligand and the nanoparticle. It is beneficial to have multiple bonds between the linking ligand and the nanoparticle. This multidentate effect, which is well known in organometallic chemistry, results in linking ligands that are held much more tightly to the nanoparticle. This is essential, since these are the points of attachment between two nanoparticles. The linking ligands must remain on a nanoparticle in order for stable multi-particle structures to be formed.

Ligands may also have one or more linker arms useful for connecting nanoparticles. The linker is used for hooking one nanoparticle to another appropriately functionalized nanoparticle. The linking ligands also typically have methylene spacer units or the like, generally five to twenty, in order to provide sufficient length so that the other arm containing the linker moiety can stick up out of the ligand sphere of the nanoparticle and be used for linking.

Figure 7A:
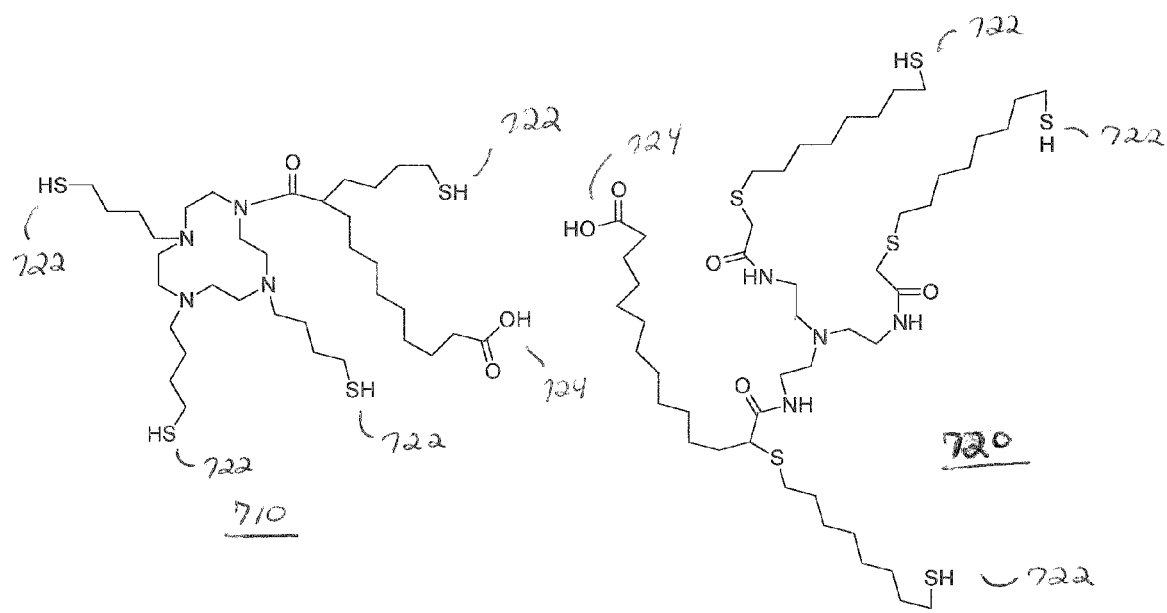
FIG. 7A depicts two exemplary ligand structures that may be used in practice of the present invention for wrapping a gold nanoparticle and providing the functionality necessary for linking particles together.

FIG. 7A depicts two exemplary ligand structures 710, 720 that can wrap a gold nanoparticle and provide the functionality necessary for linking particles together. Since the ligands wrap around the particle, two linking functionalities on the same particle will be separated spatially. Molecular modeling shows that the structures in FIG. 7A possess the appropriate structural features to allow the thiol 'arms' 722 of the molecules to bind to a gold nanoparticle surface, while the carboxylate 'linker arm' 724 points out away from the nanoparticle core, allowing it to be used for linking chemistry. Using multiple attachment points to the nanoparticle strengthens the ligand-particle bond due to the multidentate effect. This adds stability to any nanoparticle ensembles created.

These exemplary molecules are based on commercially available backbone structures and can be synthesized by one knowledgeable in organic chemistry in a very straightforward manner. These ligands also possess enough steric bulk that they will take up a significant amount of 'cone angle' around the nanoparticle, where 'cone angle' refers to the solid angle taken up on the surface of a sphere surrounding the nanoparticle whose outer surface coincides with the outer reaches of the ligand sphere around the particle. The total amount of cone angle around a sphere is $4\pi$, 12.57 steradians. Taking up cone angle around the nanoparticle helps ensure a certain amount of geometric restriction in the case where there are two or more linking moieties on one nanoparticle. This is useful, since it will help ensure that the nanoparticle ensembles obey the desired geometric rules. For example, if a straight polymer chain composed of nanoparticles is desired, the linkers would be best situated 180 degrees from each other. In that case, if each linking ligand took up half of the total solid angle of a sphere, then the linking ligands would be guaranteed to be 180 degrees apart. In a similar way, it is possible to design ligands that give linking moieties oriented in trigonal, tetrahedral, bipyramidal, and etc. geometries.

Figure 7B:
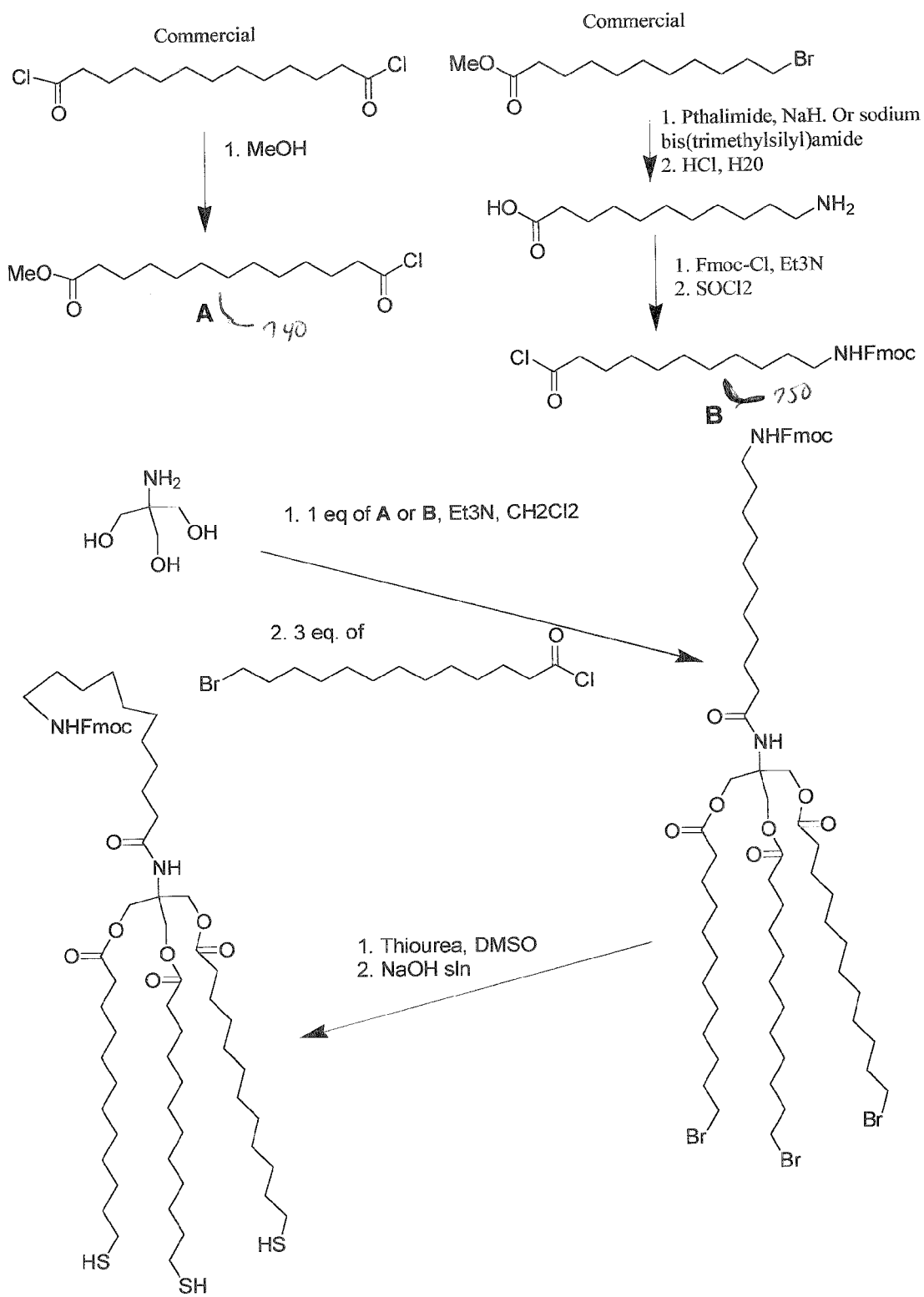
FIG. 7B depicts an exemplary synthetic scheme leading to two example molecules used for creating a bifunctional nanoparticle that may be employed in practice of the present invention.

FIG. 7B depicts the synthesis of some of the more easily synthesized ligands; more specifically, a synthetic scheme leading to two molecules for creating a bifunctional nanoparticle, again with the goal of taking up cone angle around the nanoparticle sphere. Since each of these molecules occupy a good amount of cone angle, and must displace several thiols in order to occupy a spot on the nanoparticle, it is possible to create a difunctional nanoparticle building block, either through stoichiometric ligand exchange and purification, or through stoichiometric synthesis with inert ligands such as decanethiol. By using precursors A 740 or B 750, it is possible to generate a protected amine or a protected carboxylic acid linking ligand in just a few steps. These are just examples of the many molecules that can be advantageously used in the present invention. They possess multidentate binding to a nanoparticle for stability, and they have a linking moiety that is situated such that it can be accessible outside the ligand sphere of the nanoparticle.

Figure 8:
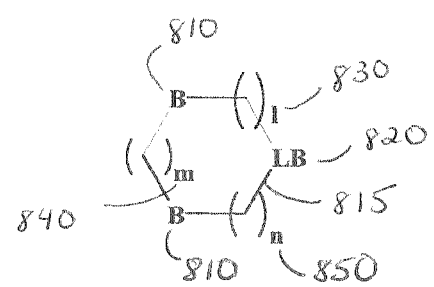
FIG. 8 depicts a generic carbocycle moiety utilizable in the present invention for the core of the ligand structure, having various attachment points.

FIG. 8 depicts a generic carbocycle moiety utilizable for the core of the ligand structure, having various attachment points. In general, a large number of permutations are available. Ligands that may be used in practicing the present invention include any ligands that have multiple arms, preferably of similar lengths, for binding to the nanoparticle, and at least one linker arm for attaching a linking moiety. In the example depicted in FIG. 8, basic elements B 810 are connected in ring 815 to any different basic element LB 820 by any number of methylene groups l 830, m 840, n 850 or by other atoms. Attachment points for thiol or other Lewis basic chelating groups (for nanoparticle coordination) can occur at any chemically accessible place on ring 815. The attachment point for the linking moiety can be at any of the ring atoms. Each segment of the cyclic structure can repeat an arbitrary number of times as well, providing any number of points of attachment to central ring 815.

Figure 9:
FIG. 9 depicts the generic structure of a chelating arm of a ligand that may be employed in practice of the present invention.
Figure 10:
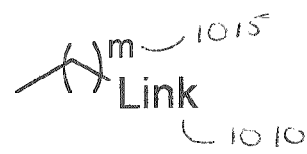
FIG. 10 depicts the generic structure of a linking arm of a ligand that may be employed in practice of the present invention.

FIGS. 9 and 10 depict the general structure of the 'arms' of a ligand that may be employed in practice of the present invention, with FIG. 9 depicting a generic chelating arm and FIG. 10 depicting a generic linking arm. In FIG. 9, chelating element or functional group LB 910 chelates to a nanoparticle's surface, thereby anchoring the ligand to the particle. If desired, chelating element or functional group LB 910 is also linked by any number of linking atoms m 915 to a linking or other functional group. In FIG. 10, linking moiety Link 1010 may be any of the large number of possible chemistries that may be used to link particles together. Suitable examples include, but are not limited to, amide bond formation and metal-assisted carbon-carbon coupling, which are orthogonal. If desired, linking moiety Link 1010 is also linked by any number of linking atoms m 1015 to a chelating element or functional group, such as is shown in FIG. 9.

Figure 11:
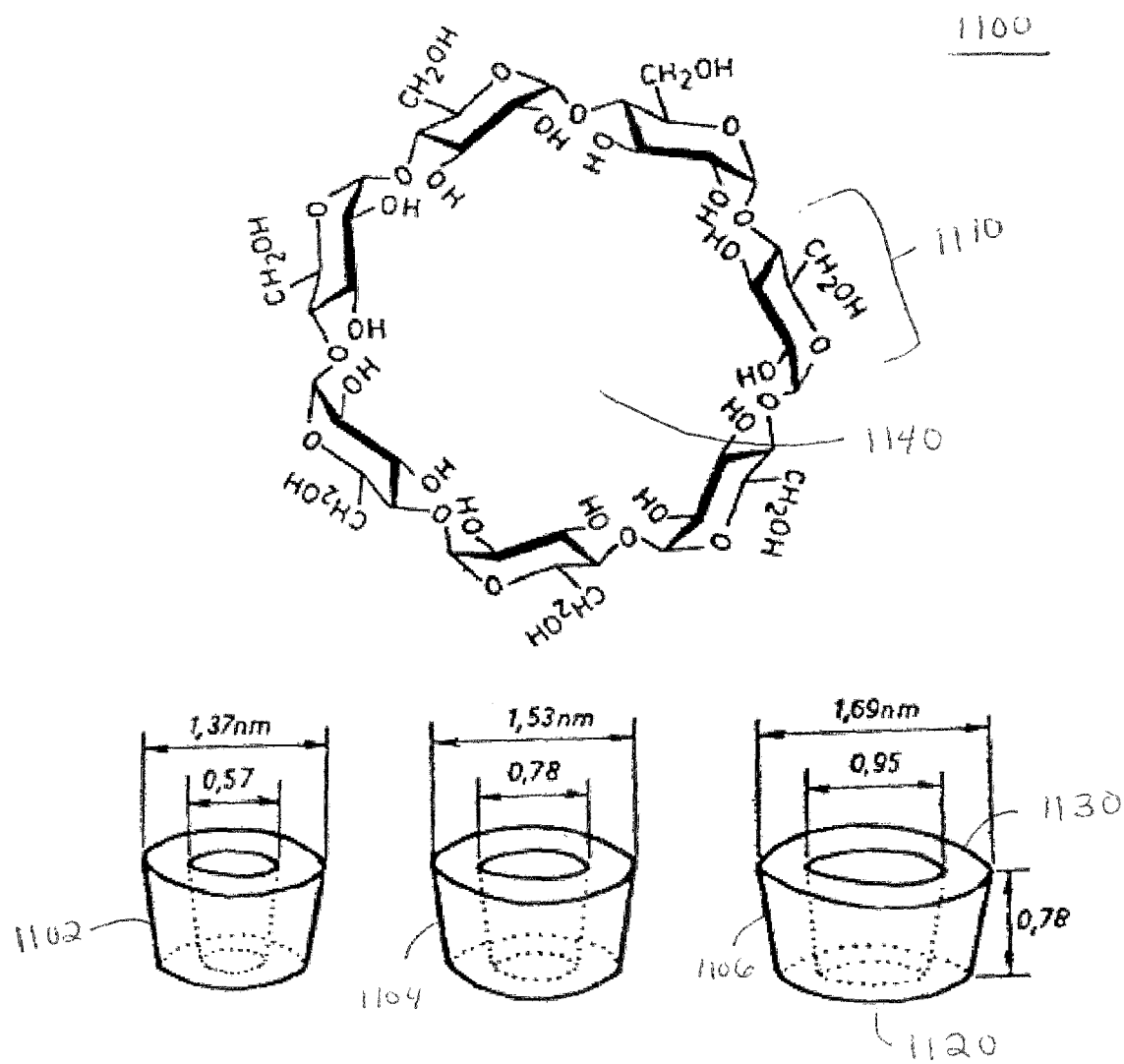
FIG. 11 depicts the B-cyclodextrin structure and the dimensions of three commercially available cyclodextrins.

In one embodiment, cyclodextrins may advantageously be used on nanoparticles in order to create links between them. Cyclodextrins are cyclic oligosaccharides that are isolated from natural sources. FIG. 11 depicts the B-cyclodextrin structure 1100 and the dimensions of the three commercially available cyclodextrins 1102, 1104, 1106. The three commercially available cyclodextrins 1102, 1104, 1106 have, respectively, 6 (α-cyclodextrin), 7 (β-cyclodextrin), and 8 (γ-cyclodextrin) D-glucose units formed into a cone-like ring and are quite inexpensive. The cyclodextrins have two sides named for the hydroxyl group numbering nomenclature in the cyclized D-glucose units 1110, all of which are oriented the same way. The 6' side 1120 is the more narrow side of the cyclodextrin in the typical cone representation shown in FIG. 11. The 2' side 1130 is the other side of the cone, having a wider opening. Cyclodextrins have a hydrophobic cavity 1140 in the middle of them that is perfect for guest-host chemistry and hence the inner dimensions are used to determine the size of a guest that can fit into the cyclodextrin inner cavity. The classical guest-host interaction is the solubilization of organics such as benzene or toluene in water through their interaction with the inner cavity of a cyclodextrin molecule. Cyclodextrins themselves are highly water soluble, since the hydroxyl groups all point away from the inner cavity, and towards the solvent.

Figure 12:
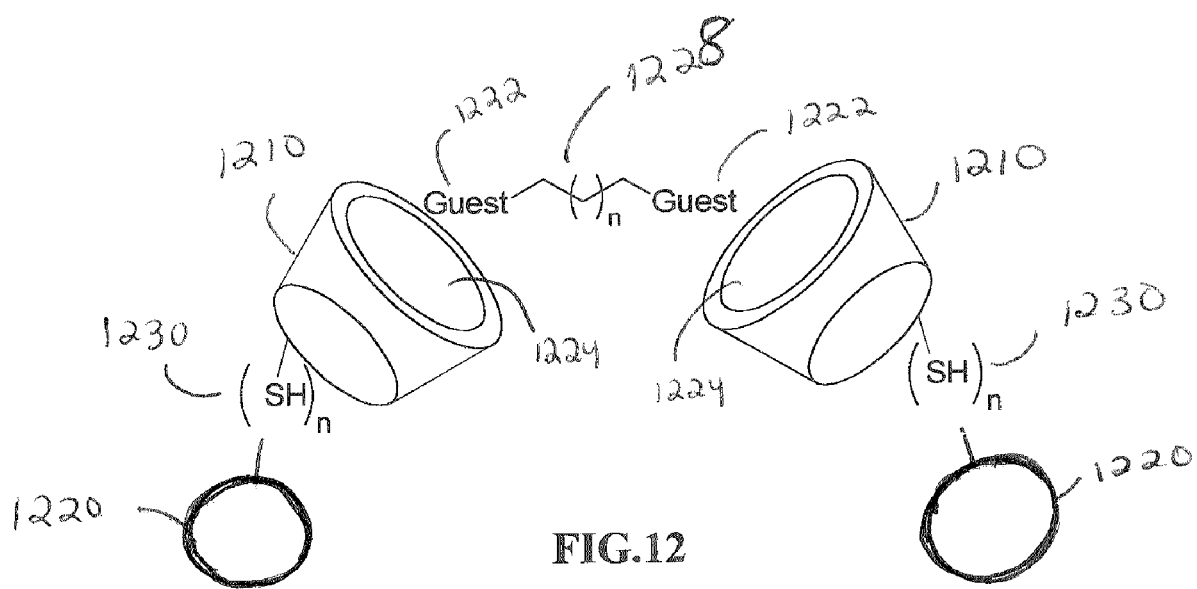
FIG. 12 depicts a linker structure according to the present invention, involving the linking of two cyclodextrin structures using host-guest chemistry.

FIG. 12 depicts a linker structure involving the linking of two cyclodextrin structures 1210 using host-guest chemistry. By anchoring each cyclodextrin 1210 to a nanoparticle 1220, it is possible to create a linkage between the nanoparticles by using a guest 1222-host 1224 interaction to create a link 1228 between two cyclodextrins. Cyclodextrins are relatively easily functionalized fully on the 6' hydroxyl group and it is easy to fully convert the 6' groups to thiols 1230. Thiols 1230 can then be used as the bonding groups for nanoparticles 1220. As shown in FIG. 12, n is the number of thiols 1230 bonding to each nanoparticle 1220, and n is 6, 7, or 8 depending on the cyclodextrin used. Due to the fact that each cyclodextrin has 6-8 thiols 1230 to bind to nanoparticle 1220, it is a particularly strong bond. Also, due to the large disruption of a nanoparticle's ligand sphere and the drastic change in the physical properties of the particle once a cyclodextrin has bound, it is relatively easy to isolate nanoparticles having, for example, one or two (for instance) cyclodextrins attached. Bonds between derivatized nanoparticles may then be formed by adding a difunctional guest molecule, such as stilbene.

Figure 13:
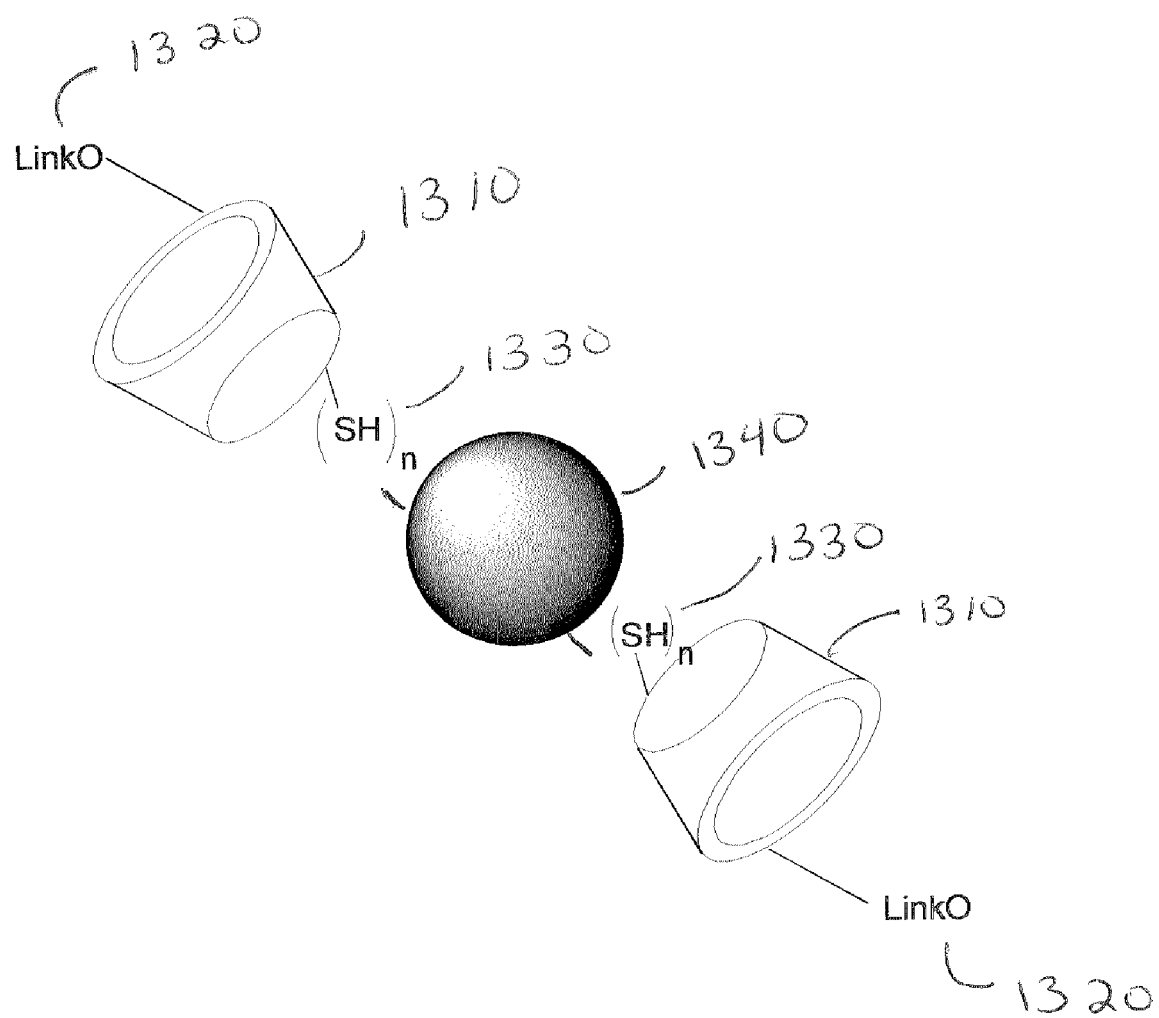
FIG. 13 depicts two cyclodextrins bound to a nanoparticle and linkers according to the present invention.

FIG. 13 depicts two cyclodextrins 1310 bound to a nanoparticle 1340 and linkers LinkO 1320. Cyclodextrin chemistry serves as an example based on more elaborate structures. By perthiolating cyclodextrin 1310 in the 6' position 1330, it is possible to attach cyclodextrin 1310 to nanoparticle 1340. As shown in FIG. 13, by functionalizing at the 2' position, which typically is a straightforward procedure, it is easy to attach linker arm LinkO 1330. Due to the size of cyclodextrin, there is only room for two such ligands to fit on each 1.5-2 nm particle. This typically produces a nanoparticle with two oppositely-situated functional linker arms. Cyclodextrins and molecules like them are extremely useful for the present invention, in that they allow a degree of control over the cone angle that a linking ligand occupies. Control of this cone angle allows for control of the geometry of the linker moieties with respect to each other.

Figure 14:
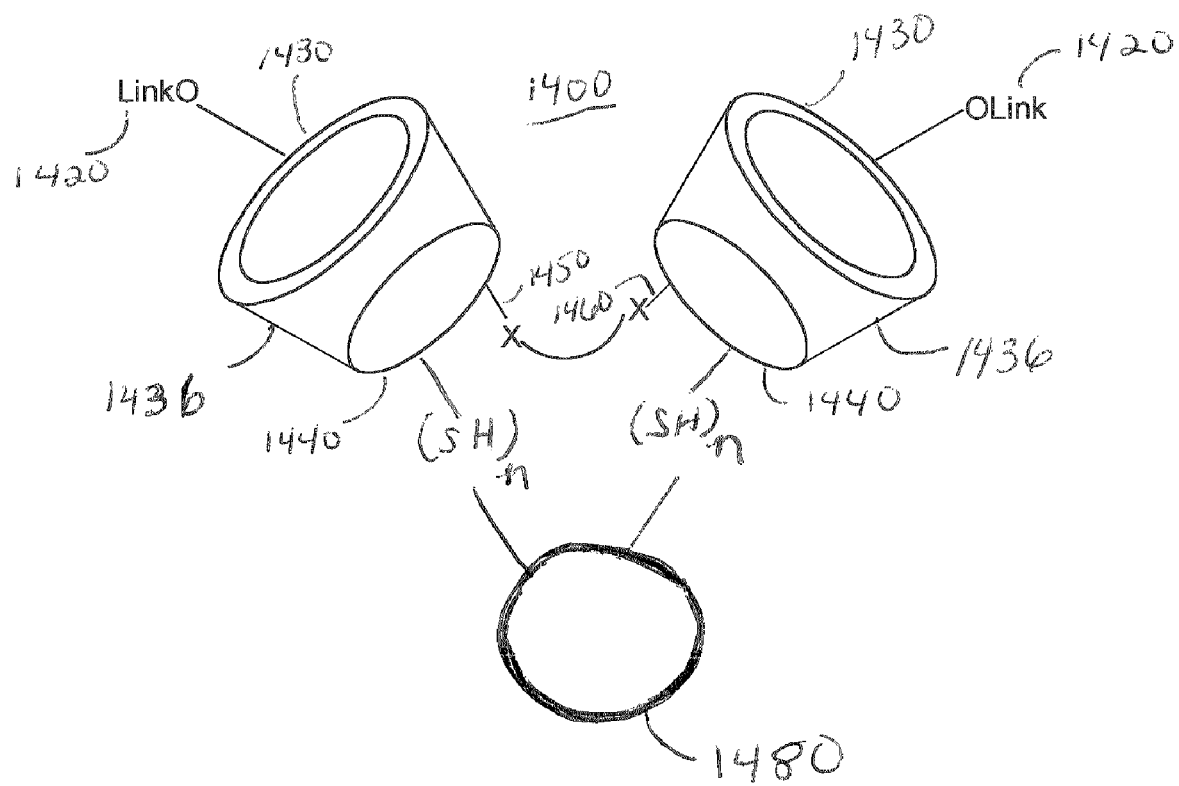
FIG. 14 depicts a cyclodextrin cage that can control nanoparticle size and linker geometry according to the present invention.

FIG. 14 depicts a cyclodextrin cage 1400 that can control nanoparticle size and linker geometry. Cyclodextrin dimers, such as the one shown in FIG. 14, can be used to control both the size of the particle and the orientation of the linker arms 1420 attached on the 2', 3' sides 1430 of the cyclodextrin molecules 1436. Cyclodextrins 1436 can be perthiolated at the 6' side 1440, other than for the two 6' positions 1450, 1460 used in the making of the cyclodextrin dimer, allowing attachment of nanoparticle 1480. By using a ligand such as the one shown in FIG. 14 during a nanoparticle synthesis, control over nanoparticle size is realized. In addition, by using this ligand on a smaller nanoparticle, the spatial arrangement of the linker arms is well controlled. Also, during a place exchange reaction, the bulk and multiple thiol bonds formed will be a significant perturbation of the nanoparticle ligand sphere, potentially making it possible to capture a singly functionalized nanoparticle (with two linker arms) by simple reaction kinetics. Further, the physical properties change dramatically, making physical separation easier as well.

Figure 15:
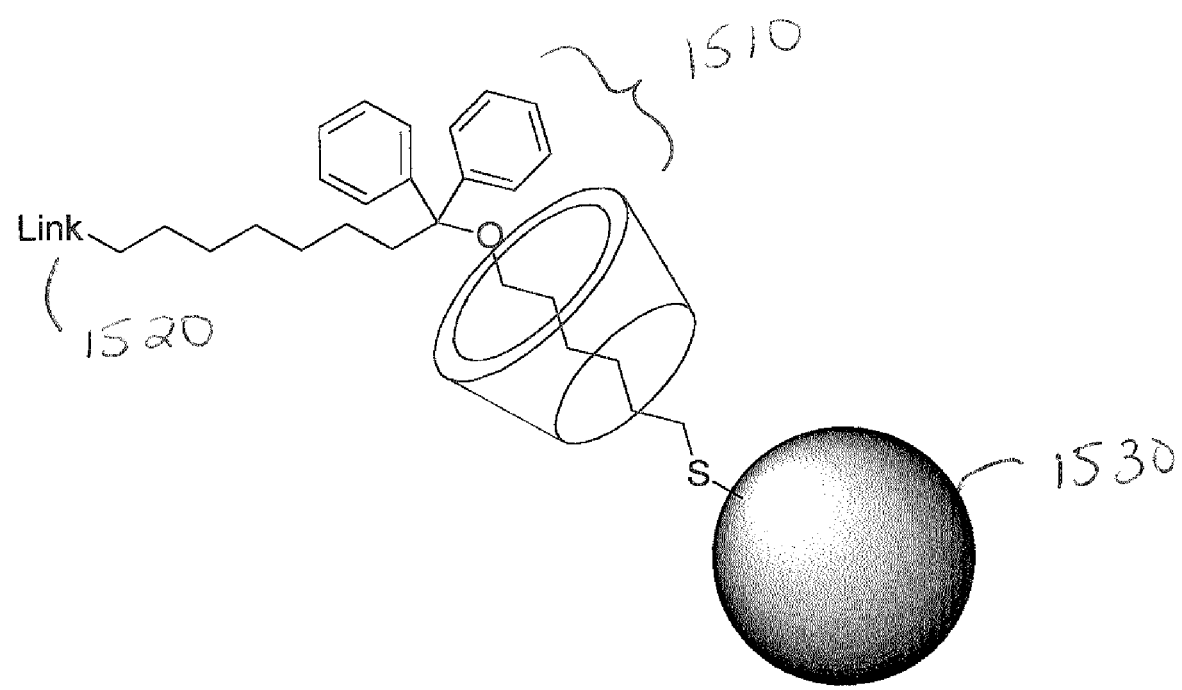
FIG. 15 depicts a cyclodextrin rotaxane designed to act as a spacer within the ligand sphere of a particle according to the present invention.

FIG. 15 depicts a cyclodextrin rotaxane 1510 designed to act as a spacer within the ligand sphere of a particle. Cyclodextrin rotaxane 1510 provides control over the geometry between two linker arms 1520. The nanoparticle 1530 provides the 'stopper' for the other end. To simplify synthesis, unfunctionalized cyclodextrins may be used as spacers on monodentate ligands possessing a linking functionality. The cyclodextrin serves to confine the linker arm to a certain orientation on the particle with respect to another cyclodextrin ligand, and prevents linker arms of complementary functionalities on the same particle from reacting in an unwanted manner. The ligand structure shown in FIG. 15 is designed to maximize the cone angle taken up by a linking ligand, therefore giving a favorable geometry when multiple linking ligands are present on one particle. Threading of cyclodextrins onto a nanoparticle using a single thiol bond has been previously demonstrated (Liu, J. et al., *Adv. Mater* 12: 1381-1383 (2000)).

Assembly of nanoparticle chains. In general, arbitrary construction of supramolecular structures, such as nanoparticle chains, is preferred. The synthesis may be conducted by any appropriate method and in any appropriate apparatus known in the art, but is preferably conducted in an apparatus much like a peptide synthesizer, using a feedstock of nanoparticle building blocks. As previously discussed, the invention involves the creation of families of ligands that can be used to construct nanoparticle chains out of nanoparticle building blocks, such as ligands and nanoparticle entities or precursors. Stepwise synthesis, either manually or in an automated synthesizer, is used to build up structures from the ligand/nanoparticle entities. Protecting groups can also be utilized in the stepwise synthesis of the ligand/nanoparticle entities.

The synthesized supramolecular structures may have unique characteristics such as anisotropic optical or electronic properties, non-linear optical polarizabilities, fluorescence, luminescence, waveguiding of photons or phonons, molecular computation, chiral catalysis in chemical synthesis and/or chiral separations, or antibody-like properties of binding specific ligands. These properties may arise due to the structure and composition of the supramolecular nanoparticle assemblies at multiple levels, e.g., primary, secondary, tertiary, and quaternary structural features, as in proteins.

The primary structure refers to the nanoparticle sequence, such as Au—Ag—CdS—$TiO_2$—Au—Au. Not only can the nanoparticle material be varied, but the structure of the linking ligands may also play a large role in the resulting overall structure. Thus, the primary sequence also refers to the specific linking ligands used in the synthesis. For example, Au(L1)-Au(L2)-Au(L3), where L1, L2, L3 represent different linking ligands, may have a significantly different preference for folding than a sequence of Au(L3)-Au(L3)-Au(L2). The secondary, tertiary, and quaternary structures are analogous to the peptide definitions, with secondary structure referring to structural motifs such as helices, tertiary structure referring to the conformation of an entire chain, and quaternary structure referring to the overall conformation of an assembly of chains.

Nanoparticle structures synthesized in accordance with the invention can exhibit folding patterns characterized by a primary, secondary, tertiary, and quaternary structural categorization, much like proteins. The nanoparticle supramolecular structures can be optimized by combinatorial chemistry techniques or by automated parallel synthesis, with results being screened based on a desired property.

The folding can be expected to follow some basic principles, much like peptides, such as, depending on the solvent used, folding due to hydrophilic/hydrophobic interactions to expose hydrophilic or hydrophobic sections to the solvent sphere. The characteristics of the folding of nanoparticle assemblies depend on factors including the geometric/dimensional parameters of the nanoparticles, size/length of the linking moiety chains, and overall colloidal sphere around each nanoparticle. The folding can be determined without undue experimentation and controlled, for example, by selecting the chemical structure (sequence) of the nanoparticle assembly/chain.

Nanoparticle assembly structures are built according to the present invention in a controlled, stepwise manner similar to peptide synthesis, which allows various techniques of parallel synthesis and combinatorial chemistry to be applied for the optimization of desirable properties. Hence, combinatorial techniques can be applied in combination with screening techniques to develop optimal structures for, for example, an 8-bit molecular adder, or a structure that binds a specific nanoparticle, or a chiral catalyst for hydrogenation. Additionally, florescent moieties may be attached to the linking ligands, thereby allowing monitoring of nanoparticle synthesis through spectroscopic techniques.

The linker moieties of the ligands are preferably designed for facile, high-yield coupling chemistry. Carboxylic acids and amines allow for the use of pre-existing peptide chemistries, which have the benefit of years of experimental optimization. Other coupling chemistries may also be applied. As discussed above, cyclodextrins may be advantageously used to create links between nanoparticles. Alternatively, a number of carbon-carbon coupling chemistries may be used to form linkages in a mild chemical manner, such as Heck reactions and pi-allyl palladium chemistry. In addition, by utilizing orthogonal protecting group chemistry, non-interfering reaction paths of amide bond-forming chemistries can be utilized.

The apparatus and method of the present invention, therefore, provide controlled synthesis of functionalized nanoparticles, nanoparticle assemblies, and nanoparticle chains. This is accomplished through generalized coupling chemistries that allow buildup of arbitrary chains of nanoparticles in a polymeric fashion, in part through the controlled incorporation of mono- to multifunctionality in the nanoparticle ligand sphere through incorporation of specifically designed chemically reactive sites. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications and substitutions by one of ordinary skill in the art are therefore also considered to be within the scope of the present invention, which is not to be limited except by the claims that follow.

What is claimed is:

1. A method for connecting nanoparticles into a multiple-nanoparticle assembly, comprising the steps of:
   providing at least one first nanoparticle having attached thereto at least one functional group of a first kind, wherein functional groups of the first kind do not react with one another, wherein the first nanoparticles and their respective attached functional groups of a first kind are free and not attached to a support;
   providing at least one second nanoparticle having attached thereto at least one functional group of a second kind, wherein functional groups of the second kind do not react with one another, and wherein the second nanoparticles and their respective attached functional groups of a second kind are free and not attached to a support; and
   reacting at least one functional group of the first kind that is attached to a first nanoparticle directly with at least one functional group of the second kind that is attached to a second nanoparticle in order to cause direct connection between the functional groups of the first and second nanoparticles, thereby forming a multiple-nanoparticle assembly that is free and not attached to a support.

2. The method of claim 1, wherein the step of reacting is initiated by removing at least one protective group from a reactive functional group on at least one of the first or second nanoparticles.

3. The method of claim 1, wherein the at least one functional group of the first kind and the at least one functional group of the second kind comprise reactive chemical moieties.

4. The method of claim 1, further comprising the step of performing additional functional group reactions in a stepwise manner until a structure of connected nanoparticles of a desired size and configuration is obtained.

5. The method of claim 4, wherein the multiple-nanoparticle assembly is a nanoparticle chain.

6. A multiple nanoparticle-based structure synthesized according to the method of claim 4.

7. The multiple nanoparticle-based structure of claim 6, wherein the nanoparticle-based structure is a nanoparticle chain.

* * * * *